US010014691B2

(12) United States Patent
Haynes

(10) Patent No.: US 10,014,691 B2
(45) Date of Patent: Jul. 3, 2018

(54) DEMAND RESPONSE SYSTEM WITH FIELD AREA NETWORK GATEWAY

(71) Applicant: Aclara Technologies LLC, Hazelwood, MO (US)

(72) Inventor: David Haynes, St. Peters, MO (US)

(73) Assignee: Aclara Technologies LLC, St. Louis, MO (US)

( * ) Notice: Subject to any disclaimer, the term of this patent is extended or adjusted under 35 U.S.C. 154(b) by 550 days.

(21) Appl. No.: 14/301,593

(22) Filed: Jun. 11, 2014

(65) Prior Publication Data
US 2014/0379158 A1 Dec. 25, 2014

Related U.S. Application Data

(60) Provisional application No. 61/837,443, filed on Jun. 20, 2013.

(51) Int. Cl.
H02J 4/00 (2006.01)
H02J 3/14 (2006.01)
H02J 13/00 (2006.01)

(52) U.S. Cl.
CPC ............... H02J 4/00 (2013.01); H02J 3/14 (2013.01); H02J 13/0062 (2013.01);
(Continued)

(58) Field of Classification Search
CPC . H02J 4/00; H02J 3/14; H02J 13/0062; Y02B 70/3225; Y02B 90/2638; Y04S 40/124; Y04S 20/222
See application file for complete search history.

(56) References Cited

U.S. PATENT DOCUMENTS 7,173,938 B1 2/2007 Davidow
2008/0172312 A1* 7/2008 Synesiou ............... G06Q 10/00
705/34
(Continued)

FOREIGN PATENT DOCUMENTS

WO 2012/008979 A2 1/2012
WO 2013/049547 A2 4/2013

OTHER PUBLICATIONS

Author Unknown, TWACS: Basics—Instructor Training Manual, Distribution Control Systems, Inc., Nov. 11, 2003, 116 pages.
(Continued)

Primary Examiner — Kenneth M Lo
Assistant Examiner — David J Wynne
(74) Attorney, Agent, or Firm — Senniger Powers LLP

(57) ABSTRACT

An energy management system (EMS) is connected to a distribution grid upstream of substation transformers and provides a demand response (DR) program signal to the distribution grid. The program signal specifies a target load adjustment. A plurality of DR RCE (Demand Response Remote Communication Equipment) are connected to phases of the distribution grid downstream of a corresponding substation transformer. Each DR RCE controls an operation of a plurality of endpoint devices. A plurality of FANG devices, each connected to phases of the distribution grid downstream of a corresponding substation transformer, receives the DR program signal via the grid. Each FANG device selectively controls power to its endpoint devices in response to a received DR program signal. As a result, the FANG device reduces the total power applied to its endpoint devices in response to the DR program signal.

18 Claims, 3 Drawing Sheets

(52) U.S. Cl.
CPC ....... *Y02B 70/3225* (2013.01); *Y02B 90/2638* (2013.01); *Y04S 20/222* (2013.01); *Y04S 40/124* (2013.01)

(56) References Cited

U.S. PATENT DOCUMENTS

| | | | |
|---|---|---|---|
| 2010/0070103 A1 | 3/2010 | Fleck et al. | |
| 2011/0066300 A1 | 3/2011 | Tyagi et al. | |
| 2011/0106321 A1 | 5/2011 | Cherian et al. | |
| 2011/0118894 A1 | 5/2011 | Reineccius et al. | |
| 2011/0196546 A1* | 8/2011 | Muller | H02J 3/383 700/295 |
| 2012/0022709 A1* | 1/2012 | Taylor | G05B 15/02 700/295 |
| 2012/0101651 A1 | 4/2012 | Haynes | |
| 2012/0265355 A1 | 10/2012 | Bernheim et al. | |
| 2013/0054044 A1* | 2/2013 | Shaffer | H02J 3/14 700/297 |
| 2013/0076140 A1 | 3/2013 | Darden et al. | |

OTHER PUBLICATIONS

Author Unknown, A Standardized and Flexible IPv6 Architecture for Field Area Networks, Smart Grid Last Mile Infrastructues, Dec. 9, 2011, 22 pages.
Author Unknown, Federal Energy Regulatory Commission, Assessment of Demand Response and Advanced Metering Staff Report, Nov. 2011, 24 pages.
Author Unknown, Federal Energy Regulatory Commission, Assessment of Demand Response and Advanced Staff Report, Dec. 2012, 130 pages.
Author Unknown, Multi-Application Smart Grid Networks, Cisco-Itron Network Solutions, Jan. 1, 2012, 4 pages.
Author Unknown, Cisco Connected Grid Security for Field Area Network, Jan. 12, 2012, 6 pages.
Author Unknown, Aclara TWACS Technology for Electric Utilities, Nov. 11, 2013, 4 pages.
Author Unknown, Aclara DRU (Demand Response Unit), Mar. 11, 2012, 2 pages.
Author Unknown, Aclara LCT (Load Control Transponder), Jul. 11, 2013, 2 pages.
Author Unknown, Substation Communications Equipment (SCE), Mar. 1, 2004, 2 pages.

* cited by examiner

DEMAND RESPONSE SYSTEM WITH FIELD AREA NETWORK GATEWAY

BACKGROUND

The invention relates to a demand response aggregation and control system and method for controlling a load on an electrical distribution grid.

Electric utilities constantly strive to balance the supply of energy against the demand. Utilities call upon Demand Response (DR) systems to affect the demand when generation is inadequate to meet the supply. The need for a Demand Response (DR) capability on an electrical distribution grid continues to increase as the use of renewable energy sources continues to increase. The Energy Independence and Security Act of 2007 required the Federal Energy Regulatory Commission (FERC) to perform a national assessment of demand response potential and to develop a national action plan on demand response. This plan, the "National Assessment & Action Plan on Demand Response" identifies 15 different DR program categories. A number of the DR programs (especially Direct Load Control) may be considered to be programs which attempt to achieve some target load shed (usually expressed in megawatts (MW)) and maintain it in real time for a specified period. It is common for network operators within a Regional Transmission Organization, an Independent System Operator, and within a utility to call a Demand Response (DR) event to control load.

SUMMARY

In one form, a system includes an energy management system (EMS) providing a demand response (DR) program signal to a distribution grid. The program signal specifies a target load adjustment. A plurality of DR RCE (Demand Response Remote Communication Equipment) are connected to phases of the distribution grid. Each DR RCE controls an operation of one or more endpoint devices. A plurality of Field Area Network Gateway (FANG) devices are connected to phases of the distribution grid. Each FANG device connected between its corresponding substation transformer and a plurality of the DR RCE. Each FANG device receives the DR program signal from the EMS and sends a RCE program signal to its DR RCE for selectively controlling power to its endpoint devices in response to a received DR program signal. Each FANG device selectively reduces the total power applied to its endpoint devices in response to the DR program signal.

In another form, an apparatus for use with an energy management system (EMS) provides a demand response (DR) program signal specifying a target load adjustment. The apparatus is for use with a plurality of DR RCE (Demand Response Remote Communication Equipment) connected to phases of the distribution grid. Each DR RCE controls an operation of one or more endpoint devices. The apparatus comprises a Field Area Network Gateway (FANG) device configured to be connected to phases of the distribution grid. Each FANG device is configured to be connected between its corresponding substation transformer and a plurality of the DR RCE for receiving the DR program signal from the EMS. Each FANG device sends a RCE program signal to its DR RCE for selectively controlling power to its endpoint devices in response to a received DR program signal. The FANG device is configured to selectively reduce the total power applied to its endpoint devices in response to the DR program signal.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
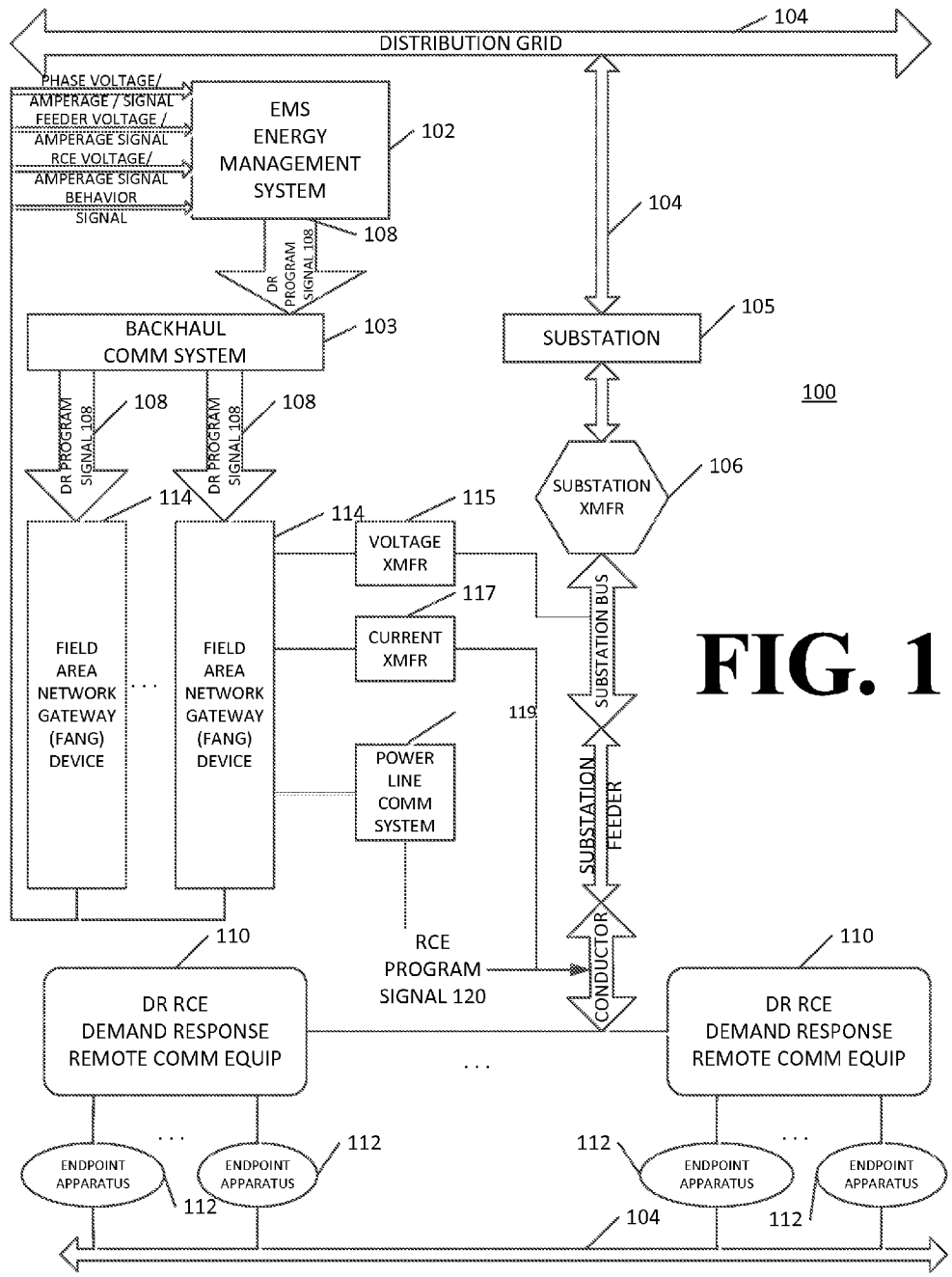
FIG. 1 is a block diagram of one embodiment of a system according to an aspect of the invention.

As shown in FIG. 1, a system 100 of the invention in one form includes an energy management system (EMS) 102 connected to a backhaul communication system 103 which in turn is connected to at least one (or more) Field Area Network Gateway (FANG) device 114 downstream of a substation 105 and a substation transformers 106, the EMS providing a demand response (DR) program signal 108 to the FANG device 114. The program signal 108 specifies a target load adjustment. The system 100 also includes one or more DR RCE 110 (Demand Response Remote Communication Equipment) devices connected to the distribution grid 104 downstream of its corresponding substation transformer 106 controlling an operation of a plurality of endpoint devices 112. In particular, each DR RCE 110 is connected to at least one phase of the distribution grid 104 downstream of its corresponding substation transformer.

Each FANG device 114 is connected to phases of the distribution grid 104 downstream of its corresponding substation transformer 106. In particular, each FANG device 114 is connected between its corresponding substation transformer 106 and a plurality of the DR RCE 110. A voltage transformer 115 connects each FANG device 114 to its phase in order to provide a voltage signal indicative of the voltage on the phase. A current transformer 117 also connects each FANG device 114 to its phase in order to provide a current signal indicative of the current on the phase. In addition, a powerline communication system 119 connects each FANG device 114 to each phase so that the FANG device can communicate with each DR RCE 110 that it manages and monitors. Each FANG device 114 receives the DR program signal 108 via the backhaul communication system 103 and sends a RCE program signal 120 to its DR RCE 110 to selectively control power to its endpoint devices 112 in response to the received DR program signal 108. Thus, the FANG device 114 reduces the total power applied to its endpoint devices 112 in response to the DR program signal 108.

One purpose of the FANG device 114 is to send a RCE program signal 120 to its DR RCEs 110 to selectively control each associated DR RCE 110 to reduce a duty cycle of power applied to one or more its endpoint devices 114 in response to the DR program signal 108. For example, the FANG device 114 can control each associated DR RCE 110 to reduce the total power of each of its associated phases applied to its endpoint devices 112 in response to the DR program signal 108 in order to substantially balance the load on its associated phases.

As another example, the FANG device 114 can control each associated DR RCE 110 to reduce the total number of its endpoint devices 112 which have their power reduced in response to the DR program signal 108. As another example, the FANG device 144 can control each associated DR RCE 110 to reduce the total power of each of its associated phases applied to its endpoint devices 112 in response to the DR program signal 108 in order to substantially balance the load on its associated phases.

In one form, the FANG device 114 samples voltage levels running through each of its associated phases via its voltage transformer 115. Sampling can be prior to responding to a particular DR program signal 108 and sampling can be after responding to the particular DR program signal 108. Thus, the FANG device 114 is able to determine a difference attributable to its response to the particular DR program signal 108 and provide a phase voltage signal to the EMS 102 representative of the samples.

In one form, the FANG device 114 samples current levels running through each of its associated phases via its current transformer 117. Sampling can be prior to responding to a particular DR program signal 108 and sampling can be after responding to the particular DR program signal 108. Thus, the FANG device 114 is able to determine a difference attributable to its response to the particular DR program signal 108 and provide a phase amperage signal to the EMS 102 representative of the samples.

In one form, the FANG device 114 periodically samples power levels running through each of its DR RCE 110 by querying its DR RCE 110 after responding to the particular DR program signal 108. Thus, the FANG device 114 is able to determine a periodic difference for each DR RCE 112 attributable to its response to the particular DR program signal 108. As a result, the FANG device can reduce the total power applied to its endpoint devices 112 in response to the determined periodic difference and in response to the DR program signal 108.

The FANG device 114 can also sample voltage and amperage levels running through the phases of a feeder connected to its substation transformer 106 prior to and after responding to a particular DR program signal 108. Thus, the FANG device 114 is able to determine a difference for the feeder attributable to its response to the particular DR program signal 108. As a result, the FANG device 114 can provide a feeder voltage/amperage signal to the EMS 108 representative of the samples.

Also, the FANG device 114 can survey each of its DR RCE 112 to determine its future program event participation. Thus, the FANG device 114 can provide behavior signals indicative of the surveys to the EMS.

Figure 2:
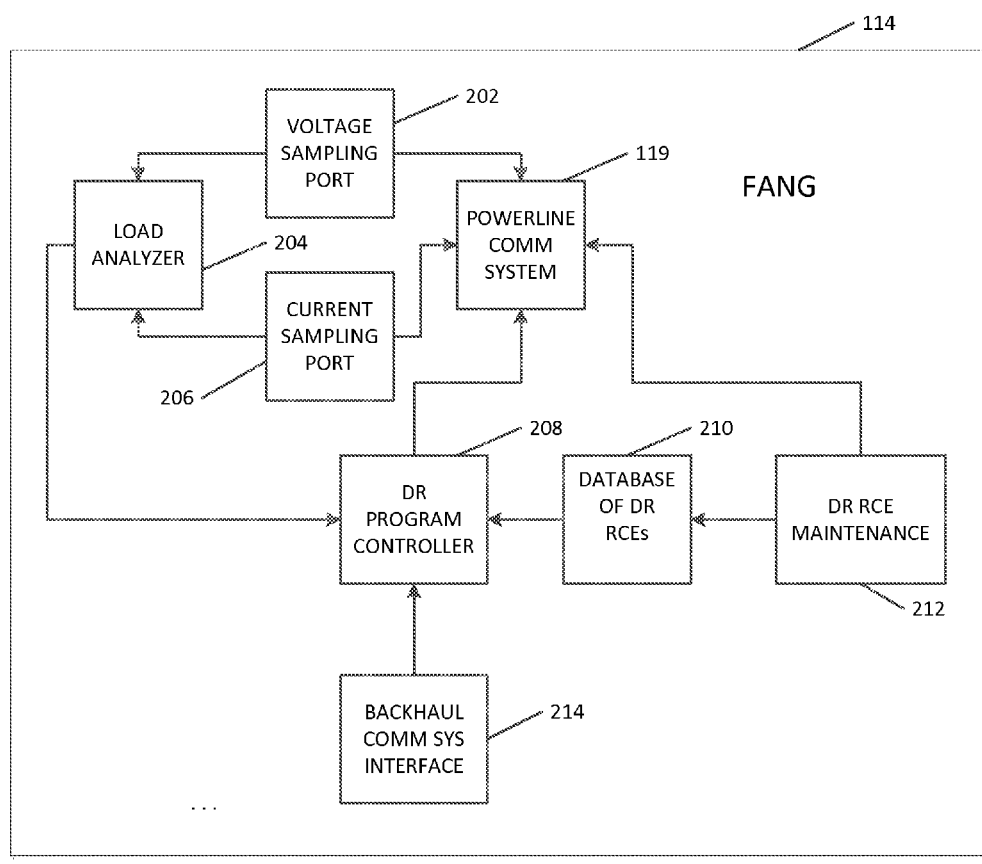
FIG. 2 is a block diagram of one embodiment of a Field Area Network Gateway (FANG) device according to an aspect of the invention.

FIG. 2 is a block diagram of one embodiment of a FANG device according to an aspect of the invention. As illustrated, the FANG device 114 has been integrated with the powerline communication system 119. This provides a cost saving and reduces the need for duplicate components. A voltage sampling port 202 connected to the voltage transformer 115 provides voltage waveforms to both a load analyzer 204 and the powerline communication system 119. Similarly, a current sampling port 206 connected to the current transformer 117 provides current waveforms to both a load analyzer 204 and the powerline communication system 119. The waveforms can be analyzed for two different purposes. The load analyzer 204 evaluates the waveforms, which are indicative of voltage and current of the FANG's corresponding DR RCE 110, relative to a DR program signal. Thus, the load analyzer 204 is able to determine the voltage, current and power of its phases and to compare these parameters to the DR program signal requirements. On the other hand, the powerline communication system 119 uses the waveforms to perform communication (over the powerline) with the DR RCEs.)

A DR Program Controller 208 receives load analysis signals from the load analyzer 204 and receives the DR program signal via a backhaul communication system interface 214. The DR Program Controller 208 accesses a database of DR RCEs 210 in order to generate DR program signals transmitted to each DR RCE 110 via the powerline communication system 119 and the powerlines.

A DR RCE maintenance device 212 provides input to the database of DR RCEs 210 and to the powerline communication system 119. The input indicates the continued availability of the DR RCEs, and load patterns for the devices they control.

A backhaul communication system interface 214 interconnects the DR program controller 208 with the backhaul communication system 103 so that DR program signals issued by the EMS 102 are provided to the DR program controller 208 for implementation.

It is contemplated that a large number of Field Area Network Gateway (FANG) devices 114 can be deployed in the field to receive, process and implement the DR program signals 108 from the EMS 102. The FANG device 114 combines CCE (Central Control Equipment) and SCE (Substation Communication Equipment) functionality into a single platform, located electrically downstream from every substation transformer.

Each FANG device 114 provides the platform from which DR aggregation occurs. The FANG device 114 issues RCE program signals to its DR RCE 110 in the field, and adjusts the implementation of the DR program signals (i.e., the DR program mix) in order to obtain the desired effects. The FANG device 114 is supplied with a target MW load shed, and makes ongoing adjustments in the duty cycle and the endpoint 112 population affected to maintain the objective while balancing the load on the phases.

When an Energy Management System (EMS) 102 issues a command to curtail load, it is routed to the various FANG device 114 within the service territory. The command can include a program type, a target MW or price parameters. The command to curtail load is to be carried by a standardized format with known security capability such as OpenADR or CIM. Once supplied with the load shed objective in megawatts (MW), DR application software stored in a tangible storage device is executed by a processor within the FANG device 114. The DR application software identifies candidate DR programs of its DR RCE 110 which are eligible to run and estimates the number of endpoints 112 and duty cycle necessary to reach the MW target. The FANG device 114 samples its CTs 117 (Current Transformers) to determine the Amperage levels running through each phase (and feeder) prior to the broadcast to capture a baseline, and samples its CTs 117 to determine the Amperage after the broadcast. The difference would be the amount attributable to the DR program. Waveform signature analysis software also running in the FANG device 114 can be configured to alert the DR application software to any tripped breakers or switching events that may interfere with its estimation process. Such an event would force the FANG device 114 to level-set by confirming the population under its control and surveying DR endpoint 112 status.

Thus, the FANG device 114 acts as a DR aggregator responsible for achieving a certain amount of load shed within its territory. As part of a control loop, it is given a target value as an input, and issues RCE program signals 120 (and/or cancellations) to its DR RCE 110 as its output.

There can be two feedback processes which confirm the load shed levels.

First, a "CT 117 Survey" process (Current Transformer Survey process) in which the Amperage of each conductor is sampled to monitor the effectiveness of the command and make adjustments as necessary to achieve the target(s).

The data used to supply the amperage data is drawn from the TWACS® (Two Way Automatic Communication System) Inbound Pickup Units which are connected to CTs 117 on the powerline 104. Alternatively or in addition, amperage data could potentially be drawn from Supervisory Control and Data Acquisition (SCADA) equipment in the substation yard, but this would create a dependency on other equipment and reduce the performance of the system in terms of availability. The "actual load shed" is measured and reported to any stakeholders that are interested. The publication of this data need not delay the progress of the DR application software and may occur in parallel to the next step in the process.

Knowing the baseline and the latest sample of current from each conductor, the actual load shed can be computed and published to any interested subscribers. This publication may take some time and may occur in parallel with the next step in the process.

Finally, the contribution due to direct load control can be computed and adjustments broadcast to the load control devices. Adjustments to the duty cycle of the entire population, or of specific populations along particular conductors may be necessary to balance power while attaining multiple load shed objectives.

Over the course of time, the nature of the load itself will vary, so corrections may be necessary to maintain the same target. Likewise, the RCE program signal 120 issued by the FANG device 114 itself may call for an increase or decrease in the load shed. With the target changing, it may be that adjustments will be needed to the duty cycle of the population. Poor estimation, or the invocation of additional DR program signals 108 from the planning authority (e.g., EMS 102) may result in the scope of the population to be revisited.

Second, in addition to sampling CTs 117, another process can run in parallel (or alternatively) to survey the DR RCE devices themselves in real time (RT). A sample of the actual behavior of the DR RCE population (e.g., program type, load shed amount) can be used to project the behavior of the population as a whole. This becomes important when multiple DR programs are in play and one or more of them rely on price signals. The point at which a consumer's appliance responds to a price point is difficult to predict. Furthermore, in some regions the consumer may be allowed to opt out (or opt in) of a given event. Only the network operator with the authority to set new market prices has the ability to affect such endpoints 112. Smart thermostats, smart appliances, and other equipment which has been equipped to participate in Real Time Pricing or Critical Peak Pricing tariffs will behave according to the (ever changing) dynamic of the consumer's preferences. The RT survey feature walks through the entire population of devices and asks them if they are participating in a program, and if so, which one. The response data (e.g., endpoint ID, date/time, program ID, loadshed contribution) is fed back to the network operator (Energy Management System) for evaluation and planning. From this survey data, real-time projections can be made as to the effectiveness of each of the DR programs in play. Those given the authority to make adjustments to the various programs are then informed.

The FANG device 114 has the authority (and ability) to invoke direct load control programs and adjust the duty cycle of the population. It does not have the ability to set prices. The control loop for these types of DR programs passes up to the planning level. The RT Survey function supports the real time feedback necessary to strategize DR price programs at the ISO/RTO level. The Network operator (using the EMS 102) is able to make adjustments to price programs and any other program that they have called. Sometimes network operators have secondary objectives (such as to minimize consumer discomfort or to minimize fuel costs) and this decision making must continue to occur at the network operations level.

The FERC (Federal Regulatory Energy Commission) has identified 15 different categories of DR programs:
 1. Direct Load Control
 2. Interruptible Load
 3. Critical Peak Pricing (CPP) with Control (New program classification)
 4. Load as Capacity Resource
 5. Spinning Reserves (Previously included in Ancillary Services classification)
 6. Non-Spinning Reserves (Previously included in Ancillary Services classification)
 7. Emergency Demand Response
 8. Regulation Service (Previously included in Ancillary Services classification)
 9. Demand Bidding and Buyback
 10. Time-of-Use Pricing
 11. Critical Peak Pricing
 12. Real-Time Pricing
 13. Peak Time Rebate
 14. System Peak Response Transmission Tariff (New program classification)
 15. Other A given endpoint 112 may be enrolled in multiple programs. With the consumer able to set price-points and other parameters, the DR endpoint 112 may respond to some RCE program signals 120 and not to others. Some DR programs entice the customer to participate with a reward. Others compel the customer to participate by means of cost consequences if the customer does not participate. Still other programs make prior arrangements with the customer to call upon their load without warning in exchange for a long-term price discount for energy.

At some point the DR RCE 110 will receive a RCE program signal 120 to which it responds. Although the consumer may be signed up for multiple programs, the load can only be shed once. The DR survey feature allows for units to report if they have responded to an RCE program signal 120, and if so, which one. This helps prevent overcounting of dispatchable load.

Load Control

A number of FERC categories noted above have enough similarity to be discussed together: 1. Direct Load Control, 2. Interruptible Load, 3. CPP with Control (just the control portion for now), 4. Load as Capacity Resource, 7. Emergency Demand Response, and 14. System Peak Response Transmission Tariff When the system is operated according to these categories, the FANG device 114 receives a command which identifies the (target) amount of load to shed. The command comes from an EMS program which computed the appropriate level of load shed for the region for the FANG device 114. (The FANG device 114 is understood to have ownership of the endpoint 112 beneath it.) The FANG device 114 then serves as a DR Aggregation System capable of Real Time closed-loop feedback.

The DR program signal 108 which identifies the load shed target can be transmitted from the EMS 102 via the powerlines 10 to the FANG device 114 by a standard, such as:
- IEC 62326 (TC57 WG16)
- OpenADR®
- IEC 61968-9 (TC57 WG14)
- MultiSpeak®

Upon receipt of a target shed amount, absent any supplied baseline value, the FANG device 114 records the current power flow through its current transformer 117 as the baseline against which to apply the objective function.

The FANG device 114 (outfitted with VTs 115 (voltage transformers) as well as CTs 117) has complete visibility to the power flowing down each phase and each feeder at its location in the substation. For example, an aggregate flow of 20 A in each of three phases, operating at 115 kV implies a power flow of 115 kV*20 A*3=6.9 MVA. A target shed amount of 1 MVA implies a current drop down to 17.1 A in each of the three phases.

In order to stay prepared for a load shed, the FANG device 114 will periodically communicate with each DR RCE 110 on record in its territory to ensure that they are communicating. If the devices can also supply usage data (showing an unofficial load profile of usage patterns for the device), this too will be harvested and used to create a usage pattern that typifies the behavior of the device under control.

In order to minimize customer discomfort, the system will rotate through the population, and activate only those units that it needs to call upon in order to achieve its objective. There will likely be certain contractual obligations to invoke certain customers a limited number of times a year. Each invocation must be logged and reported for compliance purposes.

The FANG device 114 will then issue to the DR RCE 110 the RCE program signals 120 which specify the load shed commands and watch the amperage values on each DR RCE 110 to check for compliance. The application has a multi-objective optimization that it must pursue, for it not only must reach a target load shed, it must do so in a balanced way that minimizes consumer discomfort.

Algorithm

When the FANG device 114 plans a load shed, it will be armed with information to know which bus, feeder, and phase(s) a load is on, it will know the kVA rating of each load under each DR RCE 110 as well as a probability curve that has been created from interval data. The kVA rating times the probability of actual use gives the expected value for the load shed, as noted in Equation 1:

$$\text{ExpectedValue}_{kVa}(\text{Endpoint}, t) = \text{Load}_{kVa}(\text{Endpoint}) \times P_{Endpoint}(t) \quad (1)$$

An algorithm must then select units in succession (starting with the oldest untouched unit) until the sum of the expected values reaches the target, and do so in a manner that maintains three-phase balance. For example, $$I_A = I_B = I_C = \frac{\text{Target Load Shed}}{3}$$

The selection process then satisfies the following example code for phase A to compute expected loadshed:

```
I_phase = 0;       /* zero out accumulated value */
Sort(IdList[ ])    /*Sort from oldest touch dateTime to newest touch
                     dateTime.*/
```

```
i = 0;             /*ID of oldest untouched endpoint 112 on phase A*/
t = desired starting time for load shed;
WHILE( I_phase < I_A )
    I_phase = I_phase + ExpectedValue_kVA(IdList[i],t);
    i = i + 1;     /* advance to next oldest untouched endpoint 112
                     on phase A*/
ENDWHILE
```

A similar process would be performed on phases B and C.

When the desired starting time arrives, commands would be issued to effect the desired load shed. Throughout the course of the event, the expected value of the loads will rise and fall. They very likely will not stay perfectly balanced.

Multi-Objective Optimization

A number of modern multi-objective optimization techniques can be applied. For example:
- Neural Networks (NN)
- Genetic Algorithms (GA)
- Particle Swarm Optimization (PSO)
- Ant Colony Optimization (ACO)

The PSO can be implemented and should offer good performance. Such an algorithm should be able to run for a few seconds and identify the optimal solution.

A generic approach is not necessary because the process to arrive at the optimal solution appears to be relatively straightforward. The dimensions to be optimized include:
- Favoritism of oldest untouched loads.
- Favoritism of least costly to operate loads (if differences exist among the various program options).
- Assurance that invocation rules are not being violated.
- Optimal selection of participants to reach target load shed.
- Duty cycle of population(s).
- Time diversity of population(s).

These objectives do not have the same weight. Legal objectives (contractual obligations) must be met as well as load shed objectives. A relatively straightforward process can be invoked to arrive at the optimum solution. First, the units to be involved in the DR program must be pre-qualified. This is to occur as a background task the day before the program is invoked.

If an external system is specifying the population(s) to be affected by the command, and has already checked for the possibility of invocation rule violation before issuing the order, then the problem simplifies even further.

Frequently, load sheds tend to start small, ramp up, maintain some maximum level, ramp back down, then terminate. It would be possible to select the population appropriate for the maximum of the first hour of the program (using an algorithm such as noted in the above code), and despite the coarseness of the actual loads, a duty cycle could be computed that yields the approximate desired amount at each point in time. An initial broadcast would activate the population and set it to a low duty cycle (with time diversity). As the load shaping required more load to be dumped, the duty cycle would be adjusted to maintain the new target. (This approach, i.e. fixing the population then using it throughout the day, minimizes the impact on the consumer while also minimizing the number of endpoints 112 affected.)

Probability (Communication)

If the probability of two-way communication is greater than or approximately equal to the probability of one-way communication, then the probability of "communication" can be easily derived from first try success rates or ping commands between the FANG device 114 and DR RCEs 110.

The application of this daily Boolean result applied to an Exponential Moving Average (EMA) algorithm as noted in Equation (2) can produce the needed probability as noted in Equation (3):

$$TodaysEMA_{id} = a \times TodaysFirstTryResult + (1-a) \times YesterdaysEMA_{id} \quad (2)$$

where α is a historical weighting factor between zero and one.

$$ProbabilityOfCommunication(id) = TodaysEMA_{id} \quad (3)$$

Probability (Load Interruption)

A load profile for the individual device under control can be obtained by adding a new feature to the LCT/DRU (Load Control Transponder/Demand Response Unit). Each load profile, retrieved daily, is then factored into an Exponential Moving Average (EMA) to compute a Probability Density Function (PDF). The EMA provides an efficient means of storing a weighted history in a single value. Newer history is weighted heavier than old history so that some history of consumer and device behavior is retained, but new behavior displaces old.

The device load PDF is an array of discrete probabilities for the given device "id", as noted in Equation (4). Intervals are sized at 15 minutes in duration (but other sizes are possible)

$$PDF(id) = \begin{bmatrix} p_{0,id} \\ \ldots \\ p_{95,id} \end{bmatrix} \quad (4)$$

Where $p_0$ is the probability that the device will ordinary draw load during the first interval of time in the day (00:00 to 00:15). "$p_n$" is the probability that the device 'id' will ordinarily draw load during interval "n". "$p_{95}$" is the probability that the device will ordinarily draw load during the last interval of time in the day (23:45 to 00:00).

The probability that the device will draw load during a given interval is computed by processing the interval data for the device.

similar device can be used to observe the current flow, and at the start of each interval a latching flip flop, interrupt service routine, or other similar circuit used to note that current has flowed. At the end of each interval a bit is recorded as '1' or '0' to indicate that current did or didn't flow. In one form, an ISR (Interrupt Services Routine) periodically samples a Hall Effect sensor output which has been amplified to the point of being digital. The circuit is then reset to start recording for the next interval. This array of bits is then collected throughout the day [0 0 1 0 1 . . . 1 1 0 0]. Much like metered interval data, this individual load profile data can be periodically collected and analyzed. As noted in Equation (5), the device Load Profile (LP) for a given day consists of an array of bits.

$$LP(id) = \begin{bmatrix} lp_{0,id} \\ \ldots \\ lp_{95,id} \end{bmatrix} \quad (5)$$

As noted in Equation (6), an individual interval probability $p_{n,id}$ is derived from raw data.

$$p_{n,id} = EMA_{id}(lp_n) \quad (6)$$

As noted in Equation (7), an EMA calculation for each interval of time 'n' consumes daily data from transponder 'id'

$$TodaysEMA_{n,id} = \alpha \times lp_{n,id} + (1-\alpha) \times YesterdaysEMA_{n,id} \quad (7)$$

where a determines a historical weighting value between 0 and 1.

By default, α=0.5.

Figure 3:
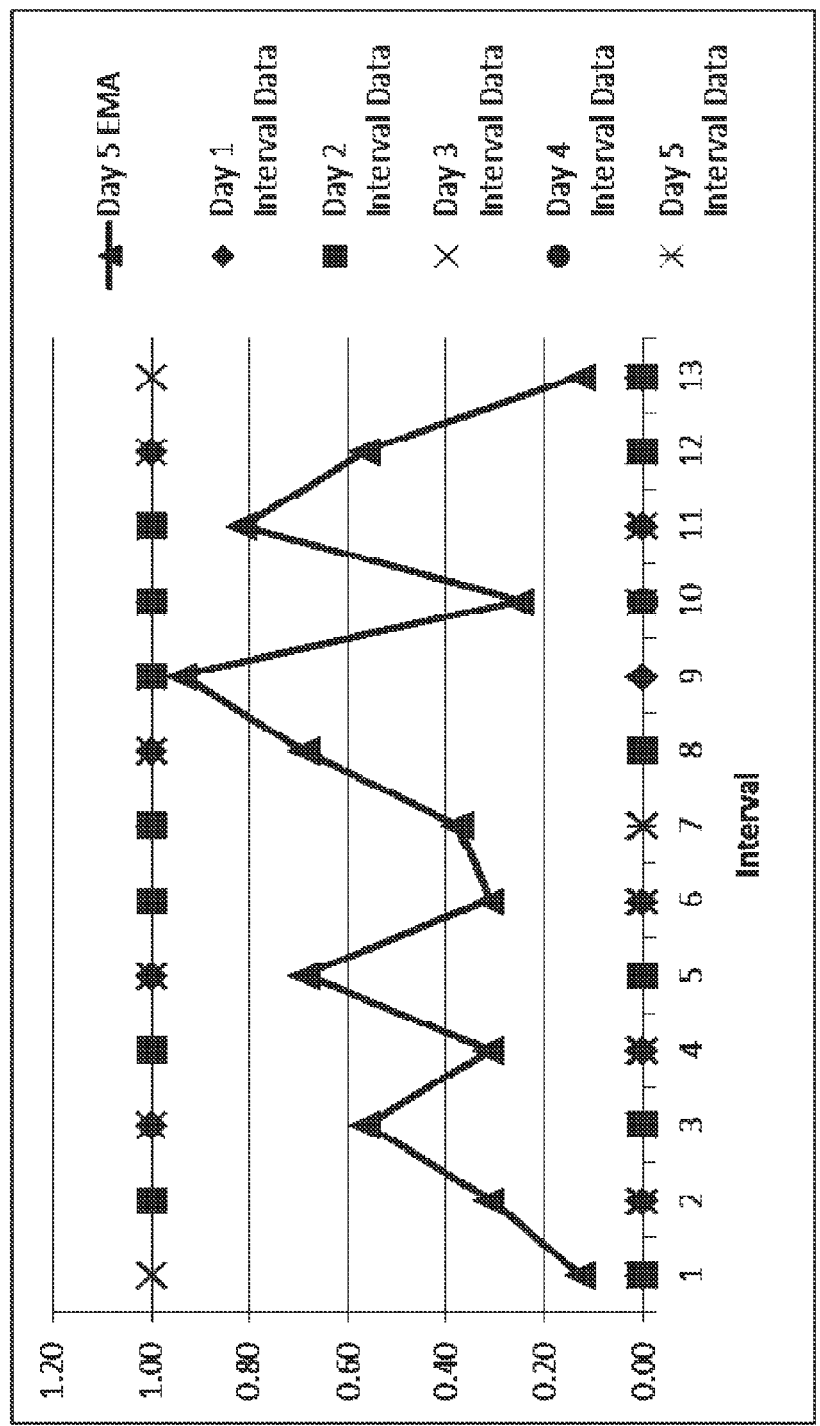
FIG. 3 is a graph illustrating an example of an Exponential Moving Average (EMA) calculation with Alpha=0.5, based on Table 1 data.

An example follows in which interval data is collected over time and compiled for five days. Not all of the intervals throughout the day are shown, but one can see over time how that the Boolean interval (illustrated in rows 1-5 of Table 1, below) data accumulates over time to form a EMA results (illustrated in rows 6-10 of Table 1, below). The information in Table 1 is plotted in FIG. 3 which illustrates the EMA curve.

TABLE 1

Example EMA Calculation with Alpha = 0.5:

| | | Interval | | | | | | | | | | | | |
|---|---|---|---|---|---|---|---|---|---|---|---|---|---|---|
| | | 0 | 1 | 2 | 3 | 4 | 5 | 6 | 7 | 8 | 9 | 10 | 11 | 12 |
| 1 | Day 1 Interval Data | 0 | 0 | 1 | 0 | 1 | 0 | 1 | 1 | 0 | 1 | 0 | 1 | 0 |
| 2 | Day 2 Interval Data | 0 | 1 | 0 | 1 | 0 | 1 | 1 | 0 | 1 | 1 | 1 | 0 | 0 |
| 3 | Day 3 Interval Data | 1 | 0 | 0 | 0 | 1 | 0 | 0 | 1 | 1 | 1 | 0 | 0 | 1 |
| 4 | Day 4 Interval Data | 0 | 1 | 0 | 1 | 0 | 1 | 1 | 0 | 1 | 0 | 1 | 0 | 0 |
| 5 | Day 5 Interval Data | 0 | 0 | 1 | 0 | 1 | 0 | 0 | 1 | 1 | 0 | 1 | 1 | 0 |
| 6 | Day 1 EMA | N/A | N/A | N/A | N/A | N/A | N/A | N/A | N/A | N/A | N/A | N/A | N/A | N/A |
| 7 | Day 2 EMA | 0.00 | 0.50 | 0.50 | 0.50 | 0.50 | 0.50 | 1.00 | 0.50 | 0.50 | 1.00 | 0.50 | 0.50 | 0.00 |
| 8 | Day 3 EMA | 0.50 | 0.25 | 0.25 | 0.25 | 0.75 | 0.25 | 0.50 | 0.75 | 0.75 | 1.00 | 0.25 | 0.25 | 0.50 |
| 9 | Day 4 EMA | 0.25 | 0.63 | 0.13 | 0.63 | 0.38 | 0.63 | 0.75 | 0.38 | 0.88 | 0.50 | 0.63 | 0.13 | 0.25 |
| 10 | Day 5 EMA | 0.13 | 0.31 | 0.56 | 0.31 | 0.69 | 0.31 | 0.38 | 0.69 | 0.94 | 0.25 | 0.81 | 0.56 | 0.13 |

A single bit can be collected during each interval. Since the LCT/DRU must be physically closed to allow the device under control to operate, it has the opportunity to observe current flow through its relay. A CT, Hall Effect sensor, or The EMA function will have an effect of smoothing the binary load profile data into an analog profile that can be considered a Probability Distribution Function. This curve then can be used as the $P_{Endpoint\ 112}(t)$ of Equation (1).

The FERC categories 5. Spinning Reserves, 6. Non-Spinning Reserves, 7. Emergency Demand Response, and possibly 8. Regulation Service can also be handled with this design.

Spinning Reserve

As a spinning reserve, the DR Aggregation function in the FANG device 114 can accept Automatic Generation Control (AGC) commands directly from the ISO. The FANG device 114 will call a DR event and manipulate the duty cycle of the population on an as-needed real-time basis in order to maintain the AGC targets. It is expected that AGC updates will occur periodically, e.g., every 6 seconds, and that real-time outbound broadcasts could occur at a similar rate. The FANG device 114 acting as an aggregator balances multiple objectives. One way to achieve balancing is transmitting different messages along different paths in order to reach the targets. Alternatively, this can be mitigated by trimming the group membership as needed along different paths to balance the load during a DR event, then broadcasting to the units participating in the DR event (along all paths) the same duty cycle adjustment command.

Non-Spinning Reserve

The system can also invoke non-spinning reserve (standby generation) by calling on them individually or in groups much like the spinning reserve scenario. In order to produce a timely response, it would give priority on the powerline to any spinning reserve activity, then rely heavily on pre-agreed arrangements established days or hours prior to the invocation.

As Applied to Price Signals

A number of DR programs fall into FERC categories which are some type of price signal: 3. Critical Peak Pricing with Control, 11. Critical Peak Pricing (CPP), Real Time Pricing (RTP), and 14. System Peak Response Transmission Tariff, are programs that rely on a price carried within a message.

In these scenarios, the price is called at the market level and (merely) delivered by the communication network to the DR endpoint 112s. Furthermore, in this model, end-to-end security implies that price messages are authenticated by the EMS and delivered unmodified, with the authentication codes, to the DR endpoint 112s. The DR endpoint 112 has the means to authenticate the sender as genuine. Some amount of key maintenance will be necessary during the days or months prior to the use of the DR program.

The performance requirements for CPP are considerably less than that of RTP. Thus, a communication between the FANG device 114 and the DR RCEs need only be performed every few minutes. "CPP with Control" utilizes a price signal until the network operators find that the price signal isn't having sufficient effect on the system, at which point the network operators start to invoke direct load control. The FANG device 114 can support direct load control as described above.

If verification is required by means of synchronous messaging, the FANG device 114 can broadcast the price multiple times, then proceed to read a register (in group mode) from its units. This could take several hours when the FANG device 114 is deployed at a large substation transformer. It could take as much as 10 minutes when deployed at a large service transformer.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A system comprising:
   An energy management system (EMS) providing a demand response (DR) program signal to a distribution grid, said program signal specifying a target load adjustment;
   A plurality of DR RCE (Demand Response Remote Communication Equipment) connected to phases of the distribution grid, each DR RCE being responsive only to the energy management system for controlling an operation of a plurality of endpoint devices associated with each DR RCE wherein each endpoint device is connected to its DR RCE and is connected to the distribution grid so that each DR RCE is connected between the EMS and its associated endpoint devices; and
   A plurality of Field Area Network Gateway (FANG) devices, each FANG device connected between and positioned between a substation and phases of the distribution grid, each FANG device connected between its corresponding substation transformer and a plurality of the DR RCE, each FANG device for receiving the DR program signal indicative of the target load adjustment from the EMS, each FANG device invoking direct load control and duty cycle adjustment by sending a RCE program signal in response to its received DR program signal to its DR RCE wherein the RCE program signal is indicative of the target load adjustment of its received DR program signal and wherein the RCE program signals cumulatively correspond to the target load adjustment,
   wherein the RCE program signals cumulatively correspond to the target load adjustment;
   wherein the RCE program signal is adapted to adjust a duty cycle of each its associated endpoint device to correspond to the target load adjustment;
   wherein the RCE program signal selectively is adapted to adjust the duty cycles of the endpoint devices to control a total power applied to the plurality of its associated endpoint devices in response to a received DR program signal wherein each FANG device selectively reduces the power applied to one or more of the plurality of its associated endpoint devices, and
   wherein the FANG device comprises:
      a load analyzer for receiving and analyzing voltage and current waveforms which are indicative of voltage and current of the FANG's corresponding DR RCE;
      a DR program controller responsive to the DR program signal and responsive to the load analyzer for generating DR program signals to be transmitted to each DR RCE; and
      a powerline communication system responsive to the DR program controller for transmitting the DR program signals to each DR RCE.

2. The system of claim 1 wherein the FANG device sends a RCE program signal in response to the DR program signal to its DR RCE to control its DR RCE to reduce a duty cycle of the power applied to at least some of the one or more of the plurality of its associated endpoint devices.

3. The system of claim 1 wherein the FANG device sends a RCE program signal in response to the DR program signal to its DR RCE to control its DR RCE to reduce the power applied to only some of its associated endpoint devices.

4. The system of claim 1 wherein the FANG device sends a RCE program signal in response to the DR program to its DR RCE to reduce a power applied to associated phases of particular devices of the one or more of its associated endpoint devices in order to substantially balance the load on the phases of the particular devices.

5. The system of claim 1 wherein the FANG device samples amperage levels running through each of its associated phases prior to responding to a particular DR program signal and samples amperage levels running through each of its associated phases after responding to the particular DR program signal to determine a difference attributable to its response to the particular DR program signal and wherein the FANG device provides a phase amperage signal to the EMS representative of the samples.

6. The system of claim 5 wherein at least one of:
the FANG device samples amperage and voltage levels running through each of its DR RCE prior to responding to a particular DR program signal and samples amperage and voltage levels running through each of its DR RCE after responding to the particular DR program signal to determine a difference for each DR RCE attributable to its response to the particular DR program signal and wherein the FANG device provides an DR RCE amperage signal to the EMS representative of the samples; and
the FANG device samples amperage levels running through a feeder connected to its substation transformer prior to responding to a particular DR program signal and samples amperage levels running through the feeder after responding to the particular DR program signal to determine a difference for the feeder attributable to its response to the particular DR program signal and wherein the FANG device provides a feeder amperage signal to the EMS representative of the samples.

7. The system of claim 1 wherein at least one of:
the FANG device samples amperage and voltage levels running through each of its DR RCE prior to responding to a particular DR program signal and samples amperage and voltage levels running through each of its DR RCE after responding to the particular DR program signal to determine a difference for each DR RCE attributable to its response to the particular DR program signal and wherein the FANG device provides an DR RCE amperage signal to the EMS representative of the samples;
the FANG device periodically samples power levels running through each of its DR RCE after responding to the particular DR program signal to determine a periodic difference for each DR RCE attributable to its response to the particular DR program signal and wherein the FANG device sends a RCE program signal to its DR RCE to reduce the total power applied to its associated endpoint devices in response to the determined periodic difference and in response to the DR program signal; and
the FANG device samples amperage levels running through a feeder connected to its substation transformer prior to responding to a particular DR program signal and samples amperage levels running through the feeder after responding to the particular DR program signal to determine a difference for the feeder attributable to its response to the particular DR program signal and wherein the FANG device provides a feeder amperage signal to the EMS representative of the samples.

8. The system of claim 1 wherein the FANG device surveys each of its DR RCE to determine its future program event participation and wherein the FANG device provides behavior signals indicative of the surveys to the EMS.

9. The system of claim 1 wherein the powerline communication system is responsive to the voltage and current waveforms to communicate with the DR RCEs and wherein the FANG device includes a DR RCE maintenance device for indicating a continued availability of the DR RCEs, and to indicate load patterns for the devices the DR RCEs control.

10. An apparatus for use with an energy management system (EMS) providing a demand response (DR) program signal specifying a target load adjustment, and for use with a plurality of DR RCE (Demand Response Remote Communication Equipment) connected to phases of the distribution grid, each DR RCE being responsive only to the energy management system for controlling an operation of a plurality of endpoint devices associated with each DR RCE wherein each endpoint device is connected to its DR RCE and is connected to the distribution grid so that each DR RCE is connected between the EMS and its associated endpoint devices, said apparatus comprising:
A Field Area Network Gateway (FANG) device configured to be connected between and positioned between a substation and phases of the distribution grid, each FANG device configured to be connected between its corresponding substation transformer and a plurality of the DR RCE, each FANG device for receiving the DR program signal indicative of the target load adjustment from the EMS, each FANG device invoking direct load control and duty cycle adjustment by sending a RCE program signal in response to the received DR program signal to its DR RCE wherein the RCE program signal is indicative of the target load adjustment of its received DR program signal and wherein the RCE program signals cumulatively correspond to the target load adjustment;
wherein the RCE program signal is adapted to adjust a duty cycle of each its associated endpoint device to correspond to the target load adjustment;
wherein the RCE program signal selectively is adapted to adjust the duty cycles of the endpoint devices to control a total power applied to the plurality of its associated endpoint devices in response to a received DR program signal wherein each FANG device selectively reduces the power applied to one or more of the plurality of its associated endpoint devices
wherein the FANG device comprises:
a load analyzer for receiving and analyzing voltage and current waveforms which are indicative of voltage and current of the FANG's corresponding DR RCE;
a DR program controller responsive to the DR program signal and responsive to the load analyzer for generating DR program signals to be transmitted to each DR RCE; and
a powerline communication system responsive to the DR program controller for transmitting the DR program signals to each DR RCE.

11. The apparatus of claim 10 wherein the FANG device sends a RCE program signal in response to the DR program signal to its DR RCE to control its DR RCE to reduce a duty cycle of the power applied to at least some of the one or more of the plurality of its associated endpoint devices.

12. The apparatus of claim 10 wherein the FANG device sends a RCE program signal in response to the DR program signal to its DR RCE to control its DR RCE to reduce the power applied to only some of its associated endpoint devices.

13. The apparatus of claim 10 wherein the FANG device sends a RCE program signal in response to the DR program to its DR RCE to reduce a power applied to associated phases of particular devices of the one or more of its associated endpoint devices in order to substantially balance the load on the phases of the particular devices.

14. The apparatus of claim 10 wherein the FANG device samples amperage levels running through each of its associated phases prior to responding to a particular DR program signal and samples amperage levels running through each of its associated phases after responding to the particular DR program signal to determine a difference attributable to its response to the particular DR program signal and wherein the FANG device provides a phase amperage signal to the EMS representative of the samples.

15. The apparatus of claim 14 wherein at least one of:

the FANG device samples amperage and voltage levels running through each of its DR RCE prior to responding to a particular DR program signal and samples amperage and voltage levels running through each of its DR RCE after responding to the particular DR program signal to determine a difference for each DR RCE attributable to its response to the particular DR program signal and wherein the FANG device provides an DR RCE amperage signal to the EMS representative of the samples; and the FANG device samples amperage levels running through a feeder connected to its substation transformer prior to responding to a particular DR program signal and samples amperage levels running through the feeder after responding to the particular DR program signal to determine a difference for the feeder attributable to its response to the particular DR program signal and wherein the FANG device provides a feeder amperage signal to the EMS representative of the samples.

16. The apparatus of claim 10 wherein at least one of:

the FANG device samples amperage and voltage levels running through each of its DR RCE prior to responding to a particular DR program signal and samples amperage and voltage levels running through each of its DR RCE after responding to the particular DR program signal to determine a difference for each DR RCE attributable to its response to the particular DR program signal and wherein the FANG device provides an DR RCE amperage signal to the EMS representative of the samples;

the FANG device periodically samples power levels running through each of its DR RCE after responding to the particular DR program signal to determine a periodic difference for each DR RCE attributable to its response to the particular DR program signal and wherein the FANG device sends a RCE program signal to its DR RCE to reduce the total power applied to its associated endpoint devices in response to the determined periodic difference and in response to the DR program signal; and the FANG device samples amperage levels running through a feeder connected to its substation transformer prior to responding to a particular DR program signal and samples amperage levels running through the feeder after responding to the particular DR program signal to determine a difference for the feeder attributable to its response to the particular DR program signal and wherein the FANG device provides a feeder amperage signal to the EMS representative of the samples.

17. The apparatus of claim 10 wherein the FANG device surveys each of its DR RCE to determine its future program event participation and wherein the FANG device provides behavior signals indicative of the surveys to the EMS.

18. The apparatus of claim 10 wherein the powerline communication system is responsive to the voltage and current waveforms to communicate with the DR RCEs and wherein the FANG device includes a DR RCE maintenance device for indicating a continued availability of the DR RCEs, and to indicate load patterns for the devices the DR RCEs control.

* * * * *